United States Patent
Dai et al.

(10) Patent No.: US 12,496,465 B2
(45) Date of Patent: Dec. 16, 2025

(54) IMAGE GUIDED RADIOTHERAPY APPARATUS AND CONTROL METHOD THEREFOR

(71) Applicants: Cancer Hospital, Chinese Acad. of Medical Sciences, Beijing (CN); Shaanxi Huaming Putai Medical Equip. Co. Ltd., Baoji (CN); Tsinghua University, Beijing (CN); Beijing Institute of Technology, Beijing (CN); Beihang University, Beijing (CN); Beijing Patesi Technology Co., Ltd., Beijing (CN); Huiying Medical Technology (Beijing) Co., Ltd., Beijing (CN); Beijing Information Science & Tech. University, Beijing (CN)

(72) Inventors: Jianrong Dai, Beijing (CN); Chuanmeng Niu, Beijing (CN); Yanfei Li, Baoji (CN); Hao Zha, Beijing (CN); Pan Ma, Beijing (CN); Shirong Wang, Beijing (CN); Fugen Zhou, Beijing (CN); Hongda Li, Beijing (CN); Minghui Li, Beijing (CN); Guozheng Lv, Baoji (CN); Xiangfei Chai, Beijing (CN); Baoying Peng, Beijing (CN); Jinyan Zhang, Baoji (CN)

( * ) Notice: Subject to any disclaimer, the term of this patent is extended or adjusted under 35 U.S.C. 154(b) by 262 days.

(21) Appl. No.: 18/206,070

(22) Filed: Jun. 5, 2023

(65) Prior Publication Data

US 2023/0398377 A1 Dec. 14, 2023

(30) Foreign Application Priority Data

Jun. 6, 2022 (CN) .......................... 202210633853.3

(51) Int. Cl.
A61N 5/10 (2006.01)

(52) U.S. Cl.
CPC .......... *A61N 5/1049* (2013.01); *A61N 5/103* (2013.01); *A61N 2005/1059* (2013.01)

(58) Field of Classification Search
None
See application file for complete search history.

(56) References Cited

U.S. PATENT DOCUMENTS

| | | | |
|---|---|---|---|
| 2002/0065461 A1* | 5/2002 | Cosman | G06T 7/73 600/429 |
| 2016/0263402 A1* | 9/2016 | Zhang | A61N 5/1049 |
| 2018/0294052 A1* | 10/2018 | Fishman | G06T 5/50 |
| 2021/0001154 A1* | 1/2021 | Dai | A61N 5/1015 |
| 2021/0052920 A1* | 2/2021 | Felici | A61B 90/39 |
| 2024/0173573 A1* | 5/2024 | Cossu | A61N 5/1075 |

* cited by examiner

*Primary Examiner* — Hoon K Song
(74) *Attorney, Agent, or Firm* — Elizabeth Chien-Hale

(57) ABSTRACT

An image guided radiotherapy apparatus and a control method are provided. According to a specific embodiment, the radiotherapy apparatus includes: a treatment unit, which includes a treatment head for generating radiation beam for radiotherapy; an imaging unit for imaging a target area of a patient, wherein the imaging unit is integrated mounted with the treatment head. The radiotherapy apparatus of the present invention can be applicable to both extracorporeal and intraoperative radiotherapy, and has a high radiotherapy accuracy.

12 Claims, 2 Drawing Sheets

IMAGE GUIDED RADIOTHERAPY APPARATUS AND CONTROL METHOD THEREFOR

CROSS-REFERENCE

The present disclosure claims a benefit of, and priority to Chinese Patent Disclosure No. 202210633853.3 filed on Jun. 6, 2022, the disclosure of which is hereby expressly incorporated by reference herein in its entirety.

TECHNICAL FIELD OF THE DISCLOSURE

The present invention generally relates to the field of radiotherapy equipment, in particular to a radiotherapy apparatus and control method therefor.

BACKGROUND

Radiotherapy is one of the important means of cancer treatment currently, and holds an important position in the field of cancer treatment. According to the patient's radiation status, radiotherapy can be divided into extracorporeal radiotherapy and intraoperative radiotherapy. During extracorporeal radiotherapy, the patient is in a conscious state and the radiation passes through the skin and normal tissues to reach the tumor area, which, while killing tumor cells, may cause certain damage to normal tissues or organs. During intraoperative radiotherapy, the patient is under anesthesia. After the tumor is surgically removed, the radiation beam directly irradiates the completely exposed tumor or residual lesion area, with minimal collateral damage to normal tissues or organs.

Extracorporeal radiotherapy often uses a C-shaped arm linear accelerator, which rotates around the patient through a rotating gantry to activate the linear accelerator to achieve radiation irradiation. Early intraoperative radiotherapy is also performed based on a C-shaped arm linear accelerators, and patients need to be transferred from the operating room to the accelerator room, posing a high risk of infection.

The existing radiotherapy apparatus cannot balance extracorporeal and intraoperative radiotherapy, resulting in poor universality. For example, the existing extracorporeal radiotherapy apparatus cannot be moved and requires a dedicated shielding room, which is not suitable for intraoperative radiotherapy. Besides, the existing intraoperative radiotherapy apparatus has a complex structure and is inconvenient to operate, and lacks image guidance and planning system support, making it impossible to achieve high-precision radiotherapy.

SUMMARY

In order to address the aforementioned shortcomings in existing technologies, the present invention patent proposes an image guided radiotherapy apparatus and a control method, which applies to both intraoperative radiotherapy and conventional extracorporeal radiotherapy, and obtain image information of the treatment area through an optical imaging system to complete simulation positioning, which can meet the high-precision operation requirements for intraoperative radiotherapy and extracorporeal radiotherapy.

According to an aspect of the present invention, an image guided radiotherapy apparatus is provided, which comprises: a treatment unit, which comprises a treatment head for generating a radiation beam for radiotherapy; and an imaging unit for imaging a target area of a patient, wherein the imaging unit is integratedly mounted with the treatment head.

In some embodiments, the radiotherapy apparatus further comprises a planning unit, which is connected to the treatment unit and the imaging unit via a connecting cable.

In some embodiments, the treatment unit further comprises: a chassis; a fixed frame, which is fixedly connected to the chassis; a motion assembly, which is installed on the fixed frame, wherein the treatment head is installed on the motion assembly; a beam blocking assembly, which is movably arranged on the chassis; and an applicator assembly, which is coaxially arranged below the treatment head.

In some embodiments, the treatment head comprises a beam irradiation device and a display screen for displaying images of the target area and/or beam irradiation parameters of the beam irradiation device.

In some embodiments, the treatment head is configured to operate the motion assembly through at least one force control handle for movement.

In some embodiments, the chassis comprises a base, a first support leg and a second support leg, wherein the first support leg and the second support leg are fixedly connected on opposite sides of the base, the first support leg, the second support leg and/or the base are provided with mounting holes for installing anchor bolts and/or mounting interfaces for installing rollers and carts, and the beam blocking assembly comprises a translational motion platform and a beam blocker, the translational motion platform is slidably arranged on the first support leg and the second support leg, and the beam blocker is movably arranged on the translational motion platform relative to the support leg.

In some embodiments, the beam blocker is a heavy metal block with a thick middle and thin edges.

In some embodiments, the applicator assembly comprises an adapter and an applicator, wherein the applicator and the adapter are coaxially arranged below the treatment head.

In some embodiments, the imaging unit comprises a camera assembly and a light source, wherein the camera assembly is used to collect image information of the target area, and the light source is installed below the treatment head.

In some embodiments, the camera assembly comprises two cameras symmetrically installed on opposite sides of the treatment head.

In some embodiments, the imaging unit further comprises an image acquisition control circuit configured to adjust imaging parameters and perform segmentation processing on the generated image.

According to another aspect of the present invention, a control method for a radiotherapy apparatus is provided, which is used to control the previously described radiotherapy apparatus. The method may comprise the following steps: positioning the radiotherapy apparatus so that the center point of a treatment area coincides with a virtual isocenter of the radiotherapy apparatus; obtaining an optical image of the treatment area by using an imaging unit; using a planning unit to generate an anatomical structure contour of the target area based on the optical image; and determining a size parameter and/or motion parameter of the treatment unit based on the anatomical structure contour, and sending the motion parameters to the treatment unit for execution by the planning unit.

In some embodiments, obtaining an optical image of the treatment area comprises moving the treatment unit, so that the center point of the treatment area coincides with the virtual isocenter, and then collecting an optical surface image of the treatment area according to an instruction.

In some embodiments, the virtual isocenter may be set at any position in a spatial area and determined by one or more reference points of the spatial area, wherein the reference points may be fixed relative to the fixed frame and located in a left and right symmetry plane of the treatment unit.

In some embodiments, the cameras in the imaging unit may move around a virtual isocenter driven by a multi degree freedom motion unit to align with the treatment area, and collect optical surface image information of the treatment area according to the instruction of an image acquisition control circuit. The optical surface image may comprise a visible light image and/or a fluorescent image. The image acquisition control circuit may be configured to perform image segmentation to determine the contour of the treatment area.

In some embodiments, the planning unit may recognize the contour image information of the treatment area and generate an anatomical structure contour of the target area. Alternatively, the anatomical structure contour may also be manually drawn by a doctor based on the optical surface image of the treatment area.

In some embodiments, the planning unit may also register the optical surface image of the treatment area with other modal images to obtain a fused image.

In some embodiments, when the radiotherapy apparatus is applied to fixed angle irradiation, the size/motion parameters of the treatment unit may comprise parameters such as the type or size of the applicator, placement angles, virtual isocenter coordinates, and the translation distance of the beam blocker.

In some embodiments, when the radiotherapy apparatus is applied to scanning irradiation, the size/motion parameters of the treatment unit may comprise parameters such as the size of an applicator, initial placement angles, virtual isocenter coordinates, scanning range, scanning path, etc.

The present invention provides a radiotherapy apparatus and control method, which can be used for both extracorporeal radiotherapy and intraoperative radiotherapy, with strong universality. By integrating optical imaging units and planning units, high-precision radiotherapy has been achieved, and the radiation beam emitted from the treatment head can accurately irradiate on the pre-identified target area. In addition, more complex scanning irradiation can be achieved through multi degree freedom movement, which can avoid damages to organs and improve the radiotherapy effect.

The above describes certain aspects, advantages, and novel features of the present invention for the purpose of summarizing the present application. It will be understood that according to any specific embodiment of the present invention, it is not necessary to achieve all of these advantages. Therefore, the present invention can be implemented by achieving or optimizing one or a set of advantages taught herein, without implementing other advantages taught or demonstrated herein.

BRIEF DESCRIPTION OF THE DRAWINGS

The following discusses various aspects of at least one example with reference to the accompanying drawings, which are not intended to be drawn to scale. The accompanying drawings are intended for providing explanations and further understanding of various aspects and examples, and the accompanying drawings are incorporated and form a part of this specification, but are not intended to serve as a definition of limitations in this application. In the accompanying drawings, each identical or almost identical component shown in each figure is represented by the same number. For clarity, not every component is marked in each attached drawing. In the figures.

DETAILED DESCRIPTION

In order to facilitate a clear and complete understanding of the technical means, creative features, objectives, and effects of the present disclosure, the following will provide a clear and complete description of the technical solution in the embodiments of the present disclosure in conjunction with the accompanying drawings. Obviously, the described embodiments are only a portion of the embodiments of the present disclosure, and the present disclosure is not limited to the precise form of these exemplary embodiments.

Figure 1:
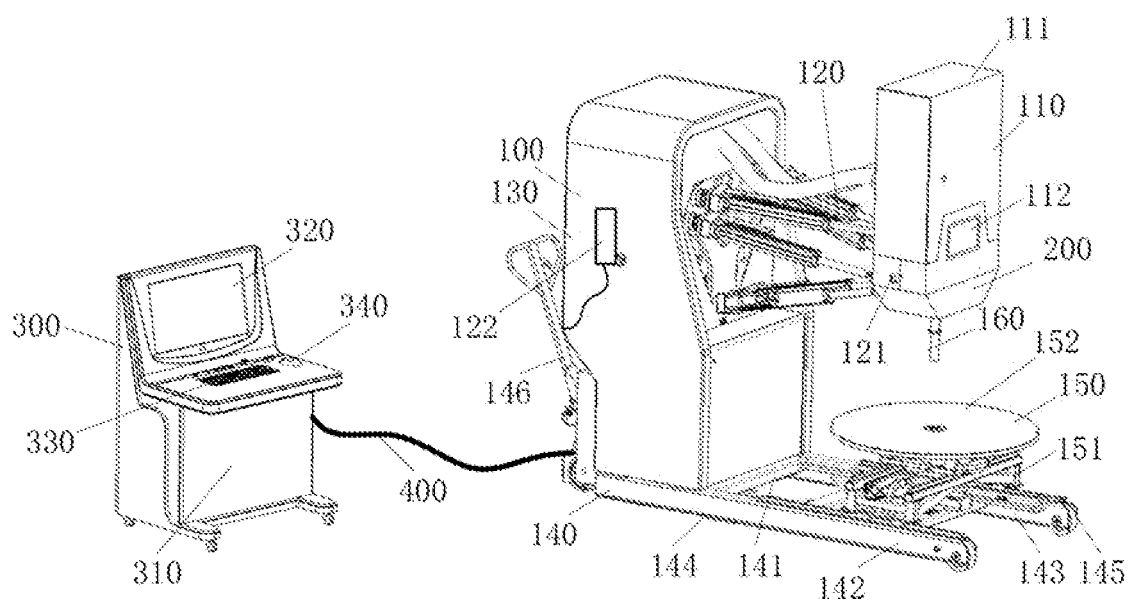
FIG. 1 is a structural schematic diagram of a radiotherapy apparatus according to an embodiment of the present disclosure.

FIG. 1 shows a structural schematic diagram of a radiotherapy apparatus according to an embodiment of the present disclosure. As shown in FIG. 1, the radiotherapy apparatus of the embodiment of the present disclosure may comprise: a treatment unit 100, an imaging unit 200, and a planning unit 300. Wherein, the treatment unit 100 is integratedly mounted with the imaging unit 200, and the treatment unit 100 and imaging unit 200 may be connected to the planning unit 300 via cables, optical fibers, and other connecting wires 400, to achieve bidirectional transmission of images, treatment plans, and other data.

In an example, the treatment unit 100 may comprise a treatment assembly for achieving radiotherapy, such as a treatment head 110 for generating radiation beams for radiotherapy, and the imaging unit 200 may comprise an imaging assembly for imaging the patient's target area. As shown in FIG. 1, the imaging unit and the treatment head can be integrated and installed in the housing, with the positions of the two relatively fixed. During radiotherapy, the imaging unit can be used to collect images of the irradiation regions and determine the target area. The radiation beam emitted by the treatment head can accurately irradiate on the target area, thus achieving image guided radiotherapy and improving the accuracy of radiotherapy.

In an embodiment of the present disclosure, the treatment unit may further comprise a multi degree freedom motion assembly 120, a fixed frame 130, a chassis 140, a beam blocking assembly 150, and an applicator assembly 160. The treatment head 110 is installed on the multi degree freedom motion assembly 120, which can drive the treatment head 110 and imaging unit 200 to move, and may be installed on the fixed frame 130. The fixed frame 130 is fixedly arranged on the chassis 140 and can be fixedly connected to the chassis 140. The beam blocking assembly 150 may be movably arranged on the chassis 140, which can be used to shield a portion of the radiation beam emitted by the treatment head during the radiotherapy process, thereby avoiding beam leakage, and thus enabling the radiotherapy apparatus of the present disclosure to be flexibly applied in various scenarios. The applicator assembly 160 may be detachably installed below the treatment head 110 and the imaging unit 200. For example, the applicator assembly 160 may be coaxially arranged below the treatment head 110 to guide the radiation beam emitted from the treatment head to the patient' target area in a certain shape.

In an embodiment, the fixed frame 130 has a hollow structure, in which some accessories of the treatment unit 100 and the imaging unit 200 can be arranged, for example, some connecting parts, solid-state modulators, motion controller, water coolers, etc. can be installed in the frame to make the treatment device more compact and easier to operate as a whole. As shown in FIG. 1, the fixed frame 130 is composed of three sections and is overall in an S-shape, which is divided into the first, second, and third sections from top to bottom. The length of each section is smaller than the overall length of the fixed frame. In one embodiment, the motion assembly 120 is at least partially embedded in the fixed frame 130, for example, connected to the first and second sections of the fixed frame 130, thereby shortening the overall length of the radiotherapy apparatus and improving its applicability.

Continuing with reference to FIG. 1, the treatment head 110 may comprise a beam irradiation device 111 and a display screen 112 for displaying images of the target area and/or beam irradiation parameters of the beam irradiation device. The beam irradiation device 111 can generate a radiation beam, which may be an electron beam and/or an X-ray. The radiation beam energy can be adjusted to meet different radiation requirements. In a specific example, the radiation beam is an electron beam of 6-12 MeV. The display screen 112 can be connected to the imaging unit and planning unit 300 to receive image data and beam radiation parameters, and display these data for doctors or relevant personnel easy to obtain relevant radiotherapy data online. The multi degree freedom motion assembly 120 may comprise multiple robotic arms, such as electrically, pneumatically, or hydraulically driven robotic arms, and can achieve multiple translational and/or rotational movements through manual or program control, thereby aligning the applicator installed below the treatment head 110 with the treatment area for a fixed angle irradiation or scanning irradiation. In one example, the multi degree freedom motion assembly 120 may be controlled by at least one force control handle, that is, the treatment head 110 may operate the multi degree freedom motion assembly 120 through the force control handle. For example, two force control handles 121 are installed on opposite sides of the treatment head 110, for easy operation, or, the multi degree freedom motion assembly 120 can move through a hand remote control box hung on one side of the frame 130.

The chassis 140 may comprise a base 141, a first support leg 142, and a second support leg 143, wherein the first support leg 142 and the second support leg 143 can be fixedly connected to opposite sides of the base 141. The first support leg 142, the second support leg 143, and/or the base 141 are provided with installation holes 144 for installing anchor bolts and/or installation interfaces for installing rollers 145 and a cart 146. The chassis 140 can be fixed to the ground through anchor bolts, allowing the radiotherapy apparatus to be used for routine extracorporeal radiotherapy. Alternatively, the roller(s) and cart may be pivotally installed on the chassis 140, allowing the radiotherapy apparatus to move flexibly between different surgical rooms for intraoperative radiotherapy. As shown in FIG. 1, four rollers 145 may be installed beneath the first support leg 142 and the second support leg 143, respectively. The rollers 145 may be ordinary universal wheels or Tottenham wheels. The cart 146 may be installed on the side of the fixed frame 130 opposite to the multi degree freedom motion assembly 120, and may be fixedly connected to the base 141. The cart may be configured to be manually or electrically actuated, to achieve translation and steering of the radiotherapy apparatus.

The beam blocking assembly 150 comprises a translational motion platform 151 and a beam blocker 152. The translational motion platform 151 is slidably arranged on the first support leg 142 and the second support leg 143. The beam blocker 152 is arranged on the translational motion platform 151, and may perform three-dimensional motion orthogonally with respect to the support legs 142 and 143. As shown in FIG. 1, the beam blocker 152 may be a circular metal block. In one example, the beam blocker 152 may be selected as a heavy metal block (lead block, etc.) with a thick middle and thin edges, such as being one with a decreasing thickness from the center to the edge, so as to absorb excess radiation beam passing through the patient. In one example, the translational motion platform 151 of the beam blocking assembly 150 may have translational motion degrees of freedom in front and back, left and right directions through the slide mechanism, etc., and may also have translational motion degrees of freedom in front and back, left and right, up and down directions through a sliding mechanism, lifting mechanism, to achieve a larger range of motion of the beam blocker 152, so as to better apply to intraoperative radiotherapy. In one example, the translational motion platform 151 and the multi degree freedom motion assembly 120 can be controlled cooperatively, that is, the treatment head 110 and the beam blocker 152 can move synchronously, so that the axis of the radiation beam emitted by the treatment head 110 is collinear with the center of the beam blocker 152 during the treatment process.

Figure 2:
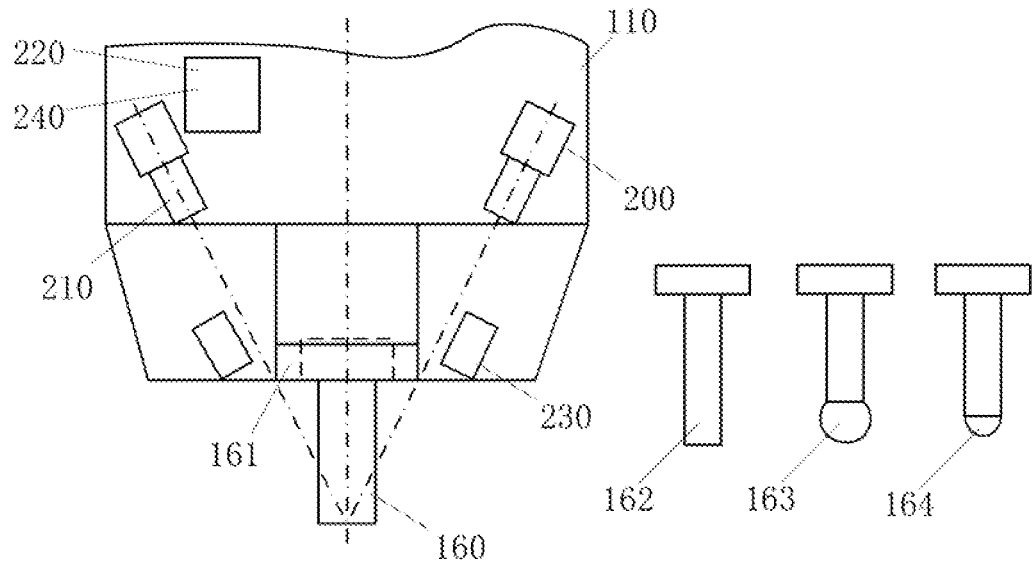
FIG. 2 is a structural schematic diagram of an optical imaging unit according to an embodiment of the present disclosure.

As mentioned earlier, the applicator assembly 160 may be located below the treatment head 110 to guide the beam emitted from the treatment head to the target area in a certain shape as needed. In an embodiment, referring to FIG. 2, the structural composition of the applicator assembly is shown. The applicator assembly 160 may comprise a split adapter 161 and an applicator 162, which can be coaxially arranged below the treatment head 110. For example, the adapter 161 is fixedly installed in a housing that accommodates the treatment head 110, and the applicator 162 may be installed on the adapter 161 through fastening means such as buckles or threaded connections. In the embodiment of FIG. 2, the adapter 161 adopts the shape of a cylinder with a central through hole to facilitate the installation and connection with applicator 162. As shown in FIG. 2, the applicator may choose different sizes of cylindrical or square collimators 162 for fixed angle or scanning irradiation according to different radiotherapy applications, or sphere shaped applicators 163 and hemisphere shaped applicators 164 for intraoperative radiotherapy that require a sphere shaped or hemisphere shaped dose distribution. As shown in FIG. 2, the applicator assembly may comprise a set of cylindrical or square collimators, a set of sphere shaped applicators, and a set of hemisphere shaped applicators. The sphere shaped applicator 163 or the hemisphere shaped applicator 164 may comprise a hollow shell with an opening, at which a scattering foil (which may be made of high atomic number materials such as metal tungsten) may be provided to scatter the radiation beam from the treatment head 110, and form a uniform dose distribution outside the surface shells of the (hemi)sphere shaped applicators 163 and 164. The opening of the shell of the (hemi)sphere shaped applicator may be connected to the collimator by a connecting structure such as a buckle. The two can also be designed integratedly and installed under the treatment head 110 through an adapter.

Continuing referring to FIG. 2, it also shows a schematic diagram of the structure of an optical imaging unit of an embodiment of the present disclosure. As shown in FIG. 2, the imaging unit 200 may comprise at least one camera 210 for collecting image information of the target area and a light source 230. The camera 210 may be installed in the housing that accommodates the treatment head 110, and the light source 230 may be installed below the treatment head to provide illumination during imaging. As shown in FIG. 2, the light source 230 may be installed below the camera 210 and set around the adapter 161. Two or more light sources 230 can be arranged around the axis of the treatment head, for example, two light sources 230 may be set, and the optical axis of the light source may be configured to be parallel to the optical axis of the camera 210 to assist in imaging the target area.

As shown in FIG. 2, two cameras 210 are configured, which are powered by a power source 220 and can be controlled by an image acquisition control circuit 240 of the imaging unit 200. The camera 210 can be a dual spectral camera, which can perform both visible light imaging and fluorescence imaging. The two cameras 210 may be symmetrically installed on opposite sides of the treatment head 110 to form binocular vision, thereby better obtaining image information of the treatment area. The optical axis of the two cameras 210 intersects with the axis of the treatment head 110 at a point. The image acquisition control circuit 240 may be configured to adjust imaging parameters and perform segmentation for the generated image to outline the contour of the treatment target area. Alternatively, a single camera 210 may be used for visible light or fluorescence imaging, and it may be installed on one side of the treatment head 110 and may also capture image information of the treatment area.

Returning to FIG. 1, the radiotherapy apparatus of the present disclosure may further comprise a planned unit 300, which is connected to the treatment unit and imaging unit via cables or wires. The planning unit 300 may comprise a hardware system and a software system, wherein the hardware system comprises components such as a computer 310, a display 320, a keyboard 330, and a mouse 340. The software system comprises one or more circuits, including but not limited to a patient data transmission circuit, an image data processing circuit, a contour definition circuit, a plan design and dose calculation circuit, a plan evaluation circuit and a system configuration circuit for target area image processing and radiotherapy plan design. For example, the image processing data circuit is configured to recognize the target area image obtained by the imaging unit 200 to generate anatomical structure contours. The planning and design circuit may then determine the parameters, e.g., sizes and/or motion parameters of each component (treatment unit, imaging unit) of the radiotherapy apparatus based on information such as anatomical structure contours. The functions of these circuits will be discussed in more detail below in conjunction with the control methods of the device.

According to the embodiments disclosed in the present invention, the radiation irradiation device herein can balance external radiotherapy and intraoperative radiotherapy through specific structural settings, such as the treatment unit and imaging unit, and can be applicable to various scenarios of radiotherapy and provide more complex scanning irradiation through the flexibly set applicator assembly and multi degree freedom motion assembly. In addition, the radiation beam can accurately irradiate on the target area identified through image recognition by integrating the optical imaging unit and planning unit, thus a high-precision radiotherapy is achieved and damage to endangered organs is avoided and the radiotherapy effect is therefore improved.

Figure 3:
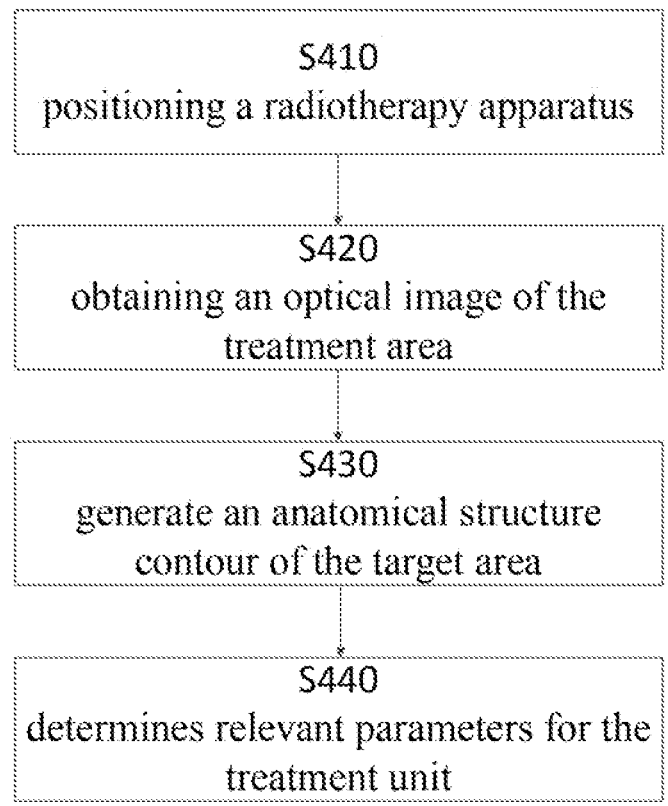
FIG. 3 is a flowchart of a control method using a radiotherapy apparatus according to an embodiment of the present disclosure.

FIG. 3 is a flowchart of a control method for a radiotherapy apparatus according to an embodiment of the present disclosure. As shown in FIG. 3, the control method for the radiotherapy apparatus may comprise the following: steps 410, positioning the radiotherapy apparatus so that the center point of the treatment area coincides with the virtual isocenter of the radiotherapy apparatus; step 420, obtaining an optical image of the treatment area by using an imaging unit; step 430, using a planning unit to generate an anatomical structure contour of the target area based on the optical image; and step 440, the planning unit determines a size parameter and/or motion parameter of the treatment unit based on the anatomical structure contour. The determined parameters may be associated with the size or position of the applicator or collimator of the radiation treatment device described in conjunction with FIGS. 1-2, so that the determined motion parameters can be sent to the treatment unit for execution, to control the radiotherapy operation of the radiation treatment device.

In step 410, for example, the radiotherapy apparatus is first moved to the vicinity of a patient lying on the treatment bed. At this time, the treatment unit 100 is located above the patient and the center point of the treatment area (of the patient) coincides with the virtual isocenter (of the treatment device) by manually or electrically adjusting the motion assembly. Based on virtual isocenter, the position of the radiotherapy apparatus is positioned so that it can be moved as needed, making it convenient for intraoperative radiotherapy and other operations. The virtual isocenter can be set to any position in a spatial area, for example, it can be determined by one or more reference points of the spatial area, wherein the reference points can be fixed relative to the fixed frame 130 in respect of position and located in a left and right symmetrical plane of the treatment unit. For example, the spatial area may be a cube space, the geometric center of which is the reference point.

In step 420, the optical imaging unit 200 may be used to obtain an optical surface image of the treatment target area. Due to the integrated installation of the imaging unit and the treatment unit, the camera 210 in the imaging unit can move around the virtual isocenter driven by the multi degree freedom motion assembly 120 to align with the treatment area. According to the instructions of the image acquisition control circuit 240, the optical surface image information of the treatment area, such as visible light images or fluorescent images, are collected, and image segmentation is performed to determine the contour of the treatment area and determine the target area.

In step 430, the target area image information obtained in step 420 may be transmitted to the planning unit 300, and the contour defining circuit of the planning unit may recognize the contour image information of the treatment area and generate the anatomical structure and contour of the target area. For example, various appropriate image processing algorithms and target recognition algorithms may be used to analyze and recognize image information such as color and geometry of the treatment area. Alternatively, the anatomical structure and contour of the target area may be manually delineated by a doctor based on the optical surface image of the treatment area.

In an embodiment, the image data processing circuit of the planning unit 300 may also register the optical surface image of the treatment area with the modal image (such as EPID, CBCT, MRI, etc.) of the treatment area to obtain a fused image, thereby better determining the planning information to protect endangered organs.

In step 440, the planning unit 300 may determine the size, motion, and other parameters of the treatment unit 110 based on the anatomical structure contour or fusion images determined in step 430.

For example, when the radiotherapy apparatus is applied to fixed angle irradiation, the planning and design circuit of the planning unit 300 can determine the size/motion parameters of the treatment unit based on information such as the shape, position, and size of the anatomical structure contour or fused image. The parameters may comprise the type or size of the applicator, placement angles, virtual isocenter coordinates, and blocking range or translation distance of the beam blocker. In some embodiments, when the radiotherapy apparatus is applied to scanning irradiation, the size/motion parameters of the treatment unit may comprise parameters such as applicator size, initial placement angle, virtual isocenter coordinates, scanning range, scanning path, etc. The determined size parameters may be displayed on the display 320 of the planning unit, for example, and the determined motion parameters may be sent to the control device of the radiotherapy apparatus for the treatment unit 110 to perform corresponding motion operations.

It shall be understood that after determining the size and motion parameters of the treatment unit 110, the operator can select the corresponding applicator and install it coaxially below the treatment head 110. Afterwards, the operator can use the force control handle 121 to guide the movement of the treatment head so that the center point of the applicator end coincides with the virtual isocenter, allowing the radiation beam to pass through the applicator and align with the tumor. During the radiotherapy process, the control device of the radiotherapy apparatus can drive the treatment head to move according to the determined motion parameters to implement fixed angle irradiation or scanning irradiation. During the implementation of radiotherapy, the optical imaging unit 200 can display the obtained tumor image in real-time on the display 320 of the planning unit 300 and/or the display 112 of the treatment head, to monitor the status of the tumor.

The principles of the present invention have been described above with reference to specific embodiments. Those skilled in the art will understand that the present invention is not limited to the aforementioned embodiments, but can be added with many modifications and variations, such as certain variations, modifications, changes, additions, and sub combinations of the disclosed embodiments, in detail and form without departing from the ideas and scope of the present invention. The scope of the present invention is defined by the accompanying claims and their equivalents.

What is claimed is:

1. An image guided radiotherapy apparatus, comprising:
   a treatment unit, comprising a treatment head for generating a radiation beam for radiotherapy;
   an imaging unit for imaging a target area of a patient, wherein the imaging unit is integratedly mounted with the treatment head; and
   a housing for accommodating the treatment head and the imaging unit;
   wherein the imaging unit comprises a camera assembly, and two or more light sources installed in the housing for providing illumination during imaging by the camera assembly, the two or more light sources being arranged around a vertical axis of the treatment head, wherein the treatment unit further comprises:
   a chassis;
   a fixed frame, which is fixedly connected to the chassis;
   a motion assembly installed on the fixed frame and at least partially embedded in the fixed frame, wherein the treatment head is installed on the motion assembly;
   a beam blocking assembly, which is movably arranged on the chassis; and
   an applicator assembly coaxially arranged below the treatment head,
   wherein the applicator assembly comprises an adapter and an applicator, the applicator being coaxially arranged with the adapter below the treatment head, and the adapter being fixedly installed at a bottom of the housing,
   and wherein the two or more light sources are installed below the camera assembly and set around the adapter.

2. The radiotherapy apparatus according to claim 1, further comprising:
   a planning unit connected to the treatment unit and the imaging unit via a connecting cable.

3. The radiotherapy apparatus according to claim 1, wherein the treatment head comprises a beam irradiation device and a display screen for displaying images of the target area and/or beam irradiation parameters of the beam irradiation device.

4. The radiotherapy apparatus according to claim 1, wherein the treatment head is configured to operate the motion assembly through at least one force control handle for movement.

5. The radiotherapy apparatus according to claim 1, wherein the chassis comprises a base, a first support leg, and a second support leg, wherein the first support leg and the second support leg are fixedly connected on opposite sides of the base, and the first support leg, the second support leg, and/or the base are provided with mounting holes for installing anchor bolts and/or mounting interfaces for installing rollers and carts, and wherein, the beam blocking assembly comprises a translational motion platform and a beam blocker, the translational motion platform is slidably arranged on the first support leg and the second support leg, the beam blocker is movably arranged on the translational motion platform relative to the support leg.

6. The radiotherapy apparatus according to claim 5, wherein the beam blocker is a heavy metal block with a thick middle and thin edges.

7. The radiotherapy apparatus according to claim 1, wherein the camera assembly comprises two cameras symmetrically installed on opposite sides of the treatment head.

8. The radiotherapy apparatus according to claim 7, wherein the camera is a dual spectral camera configured to perform both visible light imaging and fluorescence imaging.

9. The radiotherapy apparatus according to claim 1, wherein the imaging unit further comprises an image acquisition control circuit configured to adjust imaging parameters and perform segmentation processing on the generated image.

10. The radiotherapy apparatus according to claim 2, wherein the planning unit is configured to generate an anatomical structure contour of a target area based on an optical image obtained by the imaging unit.

11. The radiotherapy apparatus according to claim 2, wherein the planning unit is configured to register an optical image of a treatment area with a modal image of the treatment area to obtain a fused image.

12. A control method for a radiotherapy apparatus, the apparatus comprising a treatment unit which comprises a treatment head for generating radiation beam for radiotherapy; an imaging unit integratedly mounted with the treatment head for imaging a target area of a patient; a housing for accommodating the treatment head and the imaging unit; and a planning unit connected to the treatment unit and the imaging unit via a connecting cable, wherein the imaging unit comprises a camera assembly, and two or more light sources installed in the housing for providing illumination during imaging by the camera assembly, the two or more light sources being arranged around a vertical axis of the treatment head, wherein the treatment unit further comprises: a chassis; a fixed frame, which is fixedly connected to the chassis: a motion assembly installed on the fixed frame and at least partially embedded in the fixed frame, the treatment head being installed on the motion assembly; a beam blocking assembly, which is movably arranged on the chassis and an applicator assembly coaxially arranged below the treatment head, wherein the applicator assembly comprises an adapter and an applicator, the applicator being coaxially arranged with the adapter below the treatment head, and the adapter being fixedly installed at a bottom of the housing, wherein the two or more light sources are installed below the camera assembly and set around the adapter, and wherein the control method comprises:

positioning the radiotherapy apparatus so that the center point of a treatment area coincides with a virtual isocenter of the radiotherapy apparatus;

obtaining an optical image of the treatment area by using the imaging unit;

using the planning unit to generate an anatomical structure contour of the target area based on the optical image; and determining, by the planning unit, a size parameter and/or motion parameter of the treatment unit based on the anatomical structure contour, and sending the motion parameter to the treatment unit for execution.

\* \* \* \* \*